United States Patent
Mitra et al.

(10) Patent No.: US 12,238,580 B2
(45) Date of Patent: Feb. 25, 2025

(54) SYSTEM AND METHOD FOR FLOW CONTROL AND ACKNOWLEDGEMENT TRANSMISSION

(71) Applicant: QUALCOMM Incorporated, San Diego, CA (US)

(72) Inventors: Alok Mitra, San Diego, CA (US); Sitaramanjaneyulu Kanamarlapudi, San Diego, CA (US); Vamsi Dokku, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/905,701

(22) Filed: Jun. 18, 2020

(65) Prior Publication Data

US 2020/0404541 A1    Dec. 24, 2020

Related U.S. Application Data

(60) Provisional application No. 62/863,800, filed on Jun. 19, 2019.

(51) Int. Cl.
*H04W 28/10* (2009.01)
*H04L 1/1812* (2023.01)
(Continued)

(52) U.S. Cl.
CPC ........... *H04W 28/10* (2013.01); *H04L 1/1812* (2013.01); *H04W 4/40* (2018.02); *H04W 72/1268* (2013.01); *H04W 72/23* (2023.01)

(58) Field of Classification Search
CPC ... H04W 28/10; H04W 4/40; H04W 72/1268; H04W 72/14; H04W 28/0273; H04L 1/1812; H04L 1/16
See application file for complete search history.

(56) References Cited

U.S. PATENT DOCUMENTS 7,406,546 B1 * 7/2008 Vignon ............... G06F 13/4282
                                                                710/36
8,964,556 B2 * 2/2015 Godbole ............... H04L 47/266
                                                                370/235
(Continued)

FOREIGN PATENT DOCUMENTS

CN       107683620 A      2/2018
EP          1395000 A1    3/2004
(Continued)

OTHER PUBLICATIONS

Ericsson: "BSR Triggers Based on Buffer Level Change", 3GPP Draft, 3GPP TSG-RAN WG2 #62bis, Tdoc R2-081455, BSR_Threshold_Trigger, 3rd Generation Partnership Project (3GPP), Mobile Competence Centre, 650, Route Des Lucioles, F-06921 Sophia-Antipolis Cedex, France, vol. RAN WG2, No. Shenzhen, China, Mar. 25, 2008, Mar. 25, 2008 (Mar. 25, 2008), XP050139203, pp. 1-3, [retrieved on Mar. 25, 2008] the whole document.

(Continued)

*Primary Examiner* — Ajit Patel
*Assistant Examiner* — Wilfred Thomas
(74) *Attorney, Agent, or Firm* — Dalei Dong; Procopio, Cory, Hargreaves & Savitch LLP

(57) ABSTRACT

A configuration to enable a UE to send data to a modem, from an AP, in the absence of an uplink grant from the modem. An apparatus receives data transmissions from a base station. The apparatus stores the data transmissions in a memory of the AP of the apparatus. The apparatus identifies, by the AP, an uplink grant based at least in part on a size of a modem buffer. The apparatus determines, by the application processor, whether to send data to the modem based at least in part on the identified uplink grant. The apparatus sends, by the AP, the data when the identified uplink grant exceeds a threshold.

30 Claims, 9 Drawing Sheets

(51) Int. Cl.
  *H04W 4/40* (2018.01)
  *H04W 72/1268* (2023.01)
  *H04W 72/23* (2023.01)

(56) References Cited

U.S. PATENT DOCUMENTS

| | | | | |
|---|---|---|---|---|
| 11,252,753 | B2* | 2/2022 | Chen | H04L 1/1887 |
| 11,856,447 | B2* | 12/2023 | Lee | H04W 28/0278 |
| 2004/0114593 | A1* | 6/2004 | Dick | H04W 28/065 |
| | | | | 370/389 |
| 2011/0286335 | A1* | 11/2011 | Dubey | H04L 47/10 |
| | | | | 370/236 |
| 2012/0021788 | A1* | 1/2012 | Yavuz | H04B 17/318 |
| | | | | 455/501 |
| 2012/0127930 | A1 | 5/2012 | Nguyen et al. | |
| 2012/0250586 | A1* | 10/2012 | Ahmavaara | H04L 67/141 |
| | | | | 370/259 |
| 2012/0275307 | A1* | 11/2012 | Godbole | H04L 47/30 |
| | | | | 370/236 |
| 2013/0028204 | A1* | 1/2013 | Dinan | H04W 56/0045 |
| | | | | 370/329 |
| 2013/0142049 | A1* | 6/2013 | Jim | H04W 52/0225 |
| | | | | 370/241 |
| 2013/0182623 | A1* | 7/2013 | Fan | H04W 4/70 |
| | | | | 370/329 |
| 2013/0272229 | A1* | 10/2013 | Dinan | H04L 5/14 |
| | | | | 370/329 |
| 2014/0341028 | A1* | 11/2014 | Delorme | H04L 47/193 |
| | | | | 370/235 |
| 2015/0215738 | A1* | 7/2015 | Frusina | H04L 47/38 |
| | | | | 455/426.1 |
| 2015/0230267 | A1* | 8/2015 | Lee | H04W 72/1284 |
| | | | | 370/336 |
| 2015/0271809 | A1* | 9/2015 | Kato | H04L 5/0032 |
| | | | | 370/329 |
| 2016/0050686 | A1* | 2/2016 | Krishnamoorthi | |
| | | | | H04W 28/0278 |
| | | | | 455/418 |
| 2016/0227574 | A1 | 8/2016 | Raina et al. | |
| 2017/0156157 | A1* | 6/2017 | Zhang | H04W 24/02 |
| 2017/0212865 | A1* | 7/2017 | Yang | H04L 43/0876 |
| 2017/0310433 | A1* | 10/2017 | Dinan | H04L 27/2613 |
| 2017/0359750 | A1* | 12/2017 | Kodali | H04W 28/0252 |
| 2017/0359779 | A1* | 12/2017 | Wang | H04J 11/00 |
| 2018/0279173 | A1* | 9/2018 | Loehr | H04W 28/065 |
| 2019/0021109 | A1 | 1/2019 | Yi et al. | |
| 2019/0037591 | A1* | 1/2019 | Lee | H04W 74/0833 |
| 2019/0159236 | A1* | 5/2019 | Xu | H04W 76/30 |
| 2019/0182896 | A1* | 6/2019 | Shrestha | H04W 72/14 |
| 2019/0297635 | A1* | 9/2019 | Wu | H04W 72/12 |
| 2019/0364492 | A1* | 11/2019 | Azizi | H04W 76/14 |
| 2019/0372720 | A1* | 12/2019 | Lee | H04L 1/1832 |
| 2020/0229235 | A1* | 7/2020 | Lu | H04W 74/08 |
| 2021/0022129 | A1* | 1/2021 | Yuan | H04L 5/0057 |
| 2022/0116966 | A1* | 4/2022 | He | H04W 72/1268 |

FOREIGN PATENT DOCUMENTS

| | | |
|---|---|---|
| WO | 2017131435 A2 | 8/2017 |
| WO | 2017193274 A1 | 11/2017 |
| WO | 2018125686 A2 | 7/2018 |

OTHER PUBLICATIONS

International Search Report and Written Opinion—PCT/US2020/038687—ISA/EPO—Oct. 6, 2020.

LG Electronics Inc: "Enhanced Scheduling Request for Latency Reduction", 3GPP Draft, 3GPP TSG-RAN WG2 Meeting #92, R2-156358 Enhanced Scheduling Request for Latency Reduction, 3rd Generation Partnership Project (3GPP), Mobile Competence Centre, 650, Route Des Lucioles, F-06921 Sophia-Antipolis Cedex, vol. RAN WG2, No. Anaheim, USA, Nov. 16, 2015-Nov. 20, 2015 Nov. 16, 2015 (Nov. 16, 2015), XP051040368, pp. 1-2, Retrieved from the Internet: URL:http://www.3gpp.org/ftp/Meetings_3GPP_SYNC/RAN2/Docs/ [retrieved on Nov. 16, 2015].

Motorola: "Impact of UL Latency Reduction on TCP DL Throughputs", 3GPP Draft, 3GPP TSG RAN WG4 Meeting #67, Tdoc R2-094544, 3rd Generation Partnership Project (3GPP), Mobile Competence Centre, 650, Route Des Lucioles, F-06921 Sophia-Antipolis Cedex, France, No. Shenzhen, China, Aug. 18, 2009, Aug. 18, 2009 (Aug. 18, 2009), KP050352675, pp. 1-4, [retrieved on Aug. 18, 2009] the whole document.

* cited by examiner

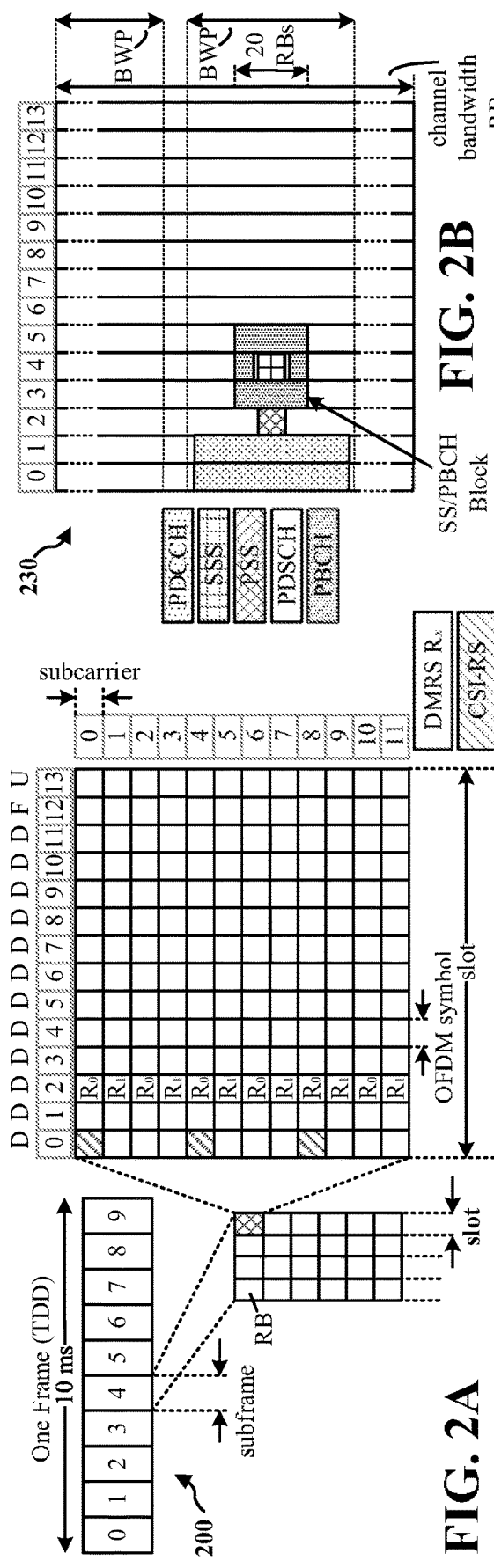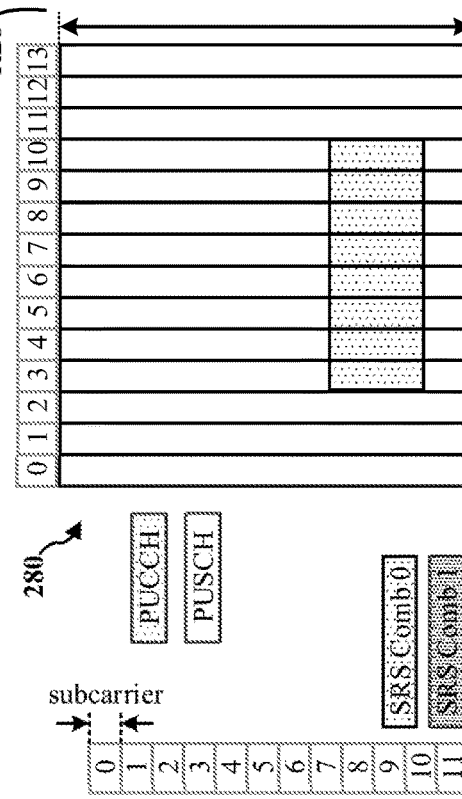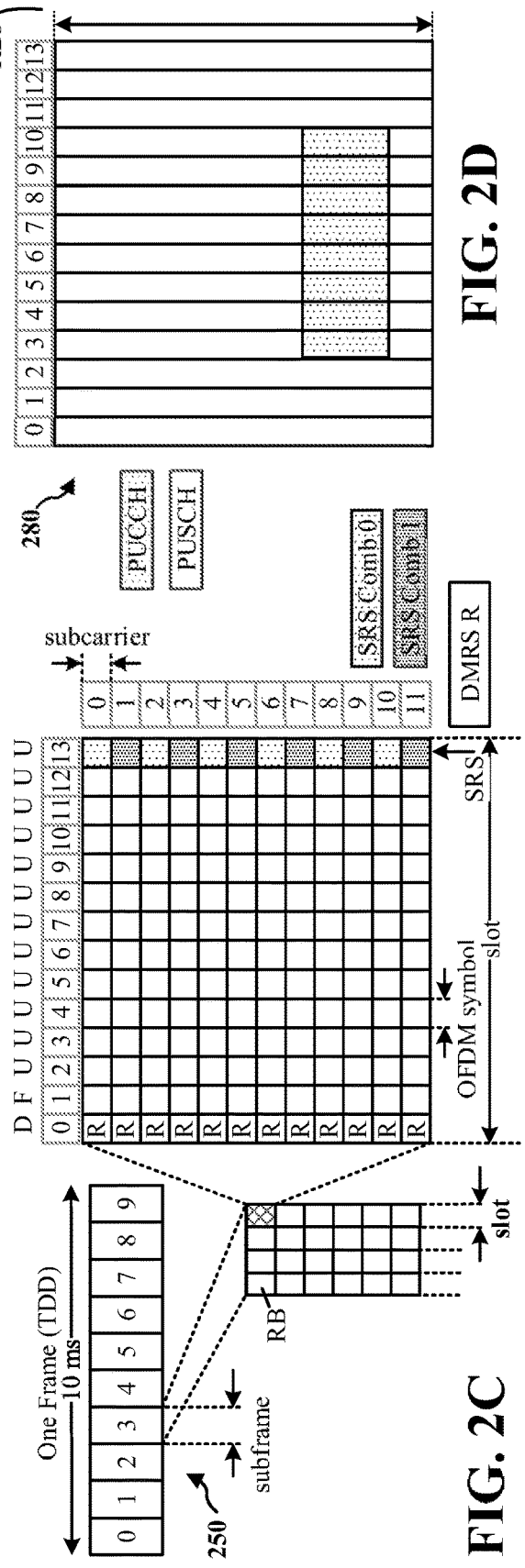
FIG. 2A  FIG. 2B  FIG. 2C  FIG. 2D

SYSTEM AND METHOD FOR FLOW CONTROL AND ACKNOWLEDGEMENT TRANSMISSION

CROSS REFERENCE TO RELATED APPLICATION(S)

This application claims the benefit of U.S. Provisional Application Ser. No. 62/863,800, entitled "System and Method for Flow Control and Acknowledgement (ACK) Transmission" and filed on Jun. 19, 2019, which is expressly incorporated by reference herein in its entirety.

BACKGROUND

Technical Field

The present disclosure relates generally to communication systems, and more particularly, to systems and methods for flow control and acknowledgement (ACK) transmission.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, a user equipment (UE) may request an uplink grant and receive that uplink grant in order to send data (e.g., to a base station). The UE may send the uplink grant request based on data (e.g., packet bytes) available in a buffer of a physical (PHY) layer, such as a buffer of a modem. For example, the UE may send the uplink grant request when the modem buffer reaches an occupancy level that satisfies (e.g., meets or exceeds) a maximum threshold.

When the modem buffer is consistently relatively high (e.g., approaching the maximum threshold), the UE may receive an uplink grant that is commensurate with the buffer occupancy, and this uplink grant may be approximately equal to the maximum uplink grant with which the UE may be scheduled. When the UE maintains this relatively high buffer occupancy, the UE may correspondingly maintain relatively highly occupied buffers at other layers of the UE (e.g., an application layer). Therefore, the UE may consistently have outstanding data that is queued in the UE to be transmitted over a network.

When the UE maintains relatively highly occupied buffers, the memory consumption at the UE may commensurately increase. As an effect of such memory consumption, the UE may experience cache inefficiencies (e.g., at one or more processors) and larger fluctuations in flow control as highly occupied buffers often take longer to be emptied and filled again. Further, the UE may drop packets, which then may be retransmitted, when the one or more buffers are highly occupied and the UE is unable to empty the one or more buffers at a sufficient rate.

In view of the foregoing, a need exists for an improved approach to sending uplink data that is buffered by a UE. In such an improved approach, the occupancy of buffer(s) of the UE may be reduced and/or the uplink data transmission by the UE may occur at a relatively consistent rate (e.g., when an application of the UE generates a large amount of data to be transmitted). Accordingly, memory efficiency at the UE may be improved and/or the number of dropped packets may be reduced.

In an aspect of the disclosure, a method, a computer-readable medium, and an apparatus are provided. The apparatus may be a device at a UE. The device may be a processor and/or a modem at a UE or the UE itself. The apparatus receives data transmission from a base station. The apparatus stores the data transmissions in a memory of the application processor (AP) of the UE. The apparatus identifies, by the AP, an uplink grant based at least in part on a size of a modem buffer. The apparatus determines, by the AP, whether to send data to the modem based at least in part on the identified uplink grant. The apparatus sends, by the AP, the data when the identified uplink grant exceeds a threshold.

In some aspects, identifying the uplink grant includes receiving an uplink grant from the modem.

In some aspects, identifying the uplink grant includes determining by the AP an uplink grant.

In some aspects, the data includes transmission control protocol (TCP) data or TCP acknowledgement (ACK) feedback associated with the data transmissions.

In some aspects, the data includes transmission control protocol (TCP) acknowledgment (ACK) feedback, cellular vehicle-to-everything (C-V2X) data, virtual reality (VR) data, extended reality (XR) data, ultra-reliable low latency communication (ULLC) data, or any specific traffic type/pattern.

In some aspects, to determine whether to send data to the modem from the AP, the AP is configured to manage the flow of data from the AP to the modem based at least on one or more thresholds of the modem buffer.

In some aspects, the data includes any identified application data that corresponds to a specified application that is identified by a user or the modem.

In some aspects, the data may be sent, by the AP, when the identified uplink grant is zero (0).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
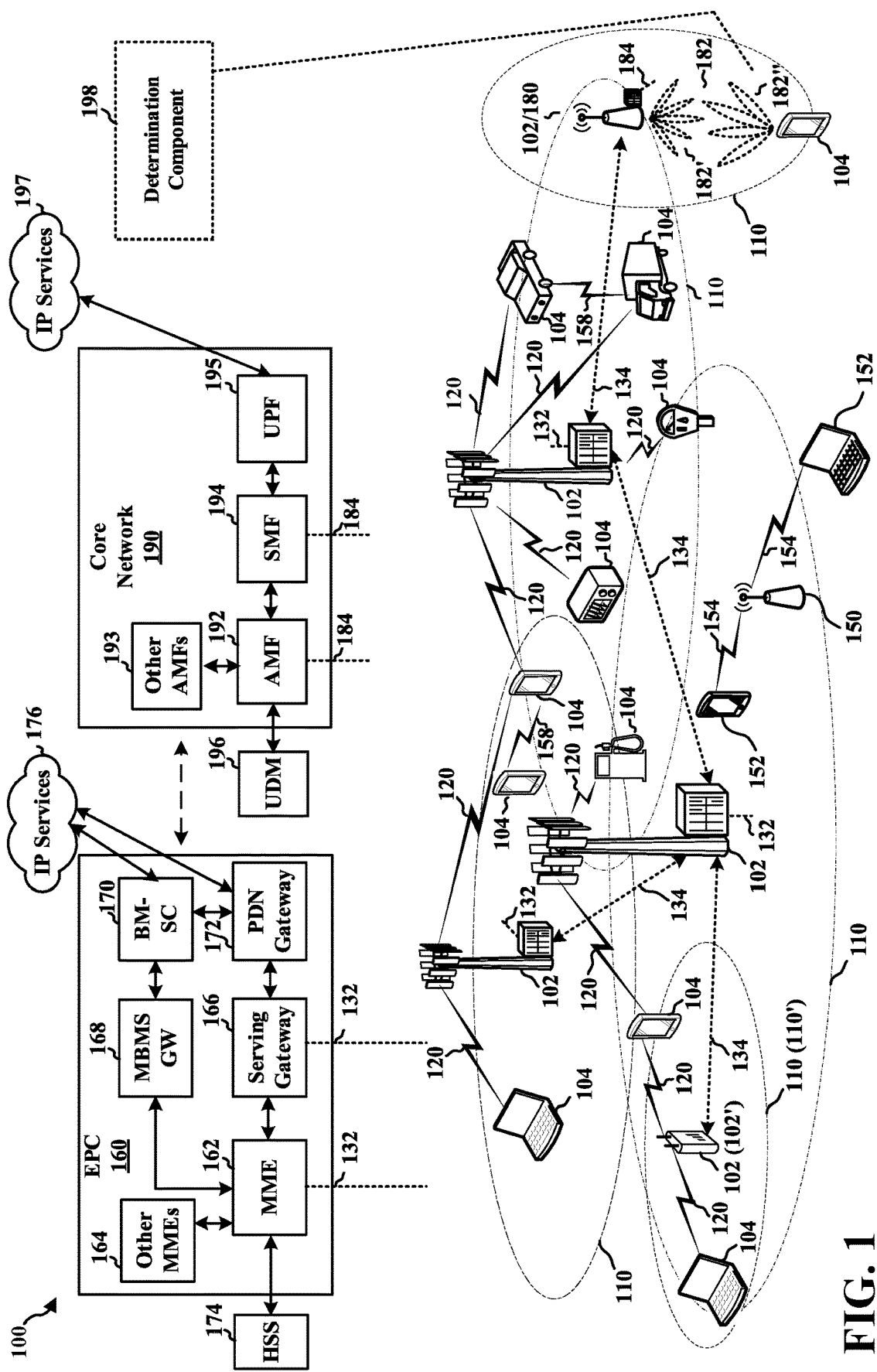
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN)

sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may determine, at a first layer of a protocol stack of the UE 104, a first data size associated with a second layer of the protocol stack, such as an application layer. The first data size may exceed a first queue threshold associated with the first layer of the protocol stack of the UE 104. The UE 104 may send an uplink grant request over a wireless network, and the UE 104 may generate the uplink grant request based on the first data size.

Based on the uplink grant request, the UE 104 may receive at least two uplink grants. The at least two uplink grants may indicate a peak transport block (TB) size per transmission time interval (TTI) available for uplink communication by the UE 104. Responsive to the at least two uplink grants, the UE 104 may send, over the wireless network, first data in a first TTI and second data in a second TTI.

Referring again to FIG. 1, in some aspects, the UE 104 may be configured to send data to a modem from the AP in the absence of an uplink grant from the modem. For example, the UE 104 of FIG. 1 may include a determination component 198 configured to determine to send data to a modem from the AP in the absence of an uplink grant from the modem. The UE 104 receives data transmissions from a base station 102/180. The UE 104 stores the data transmissions in a memory of the AP of the UE 104. The UE 104 identifies, by the AP, an uplink grant based at least in part on a size of a modem buffer. The UE 104 determines, by the AP, whether to send data to the modem of the UE 104 based at least in part on the identified uplink grant. The UE 104 sends, by the AP, the data when the identified uplink grant exceeds a threshold.

Although the present disclosure and accompanying drawings may be focused on 5G New Radio (NR), the concepts described herein may be applicable to other similar areas, such as LTE, LTE-Advanced (LTE-A), Code Division Multiple Access (CDMA), Global System for Mobile communications (GSM), and/or other wireless/radio access technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe.

Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
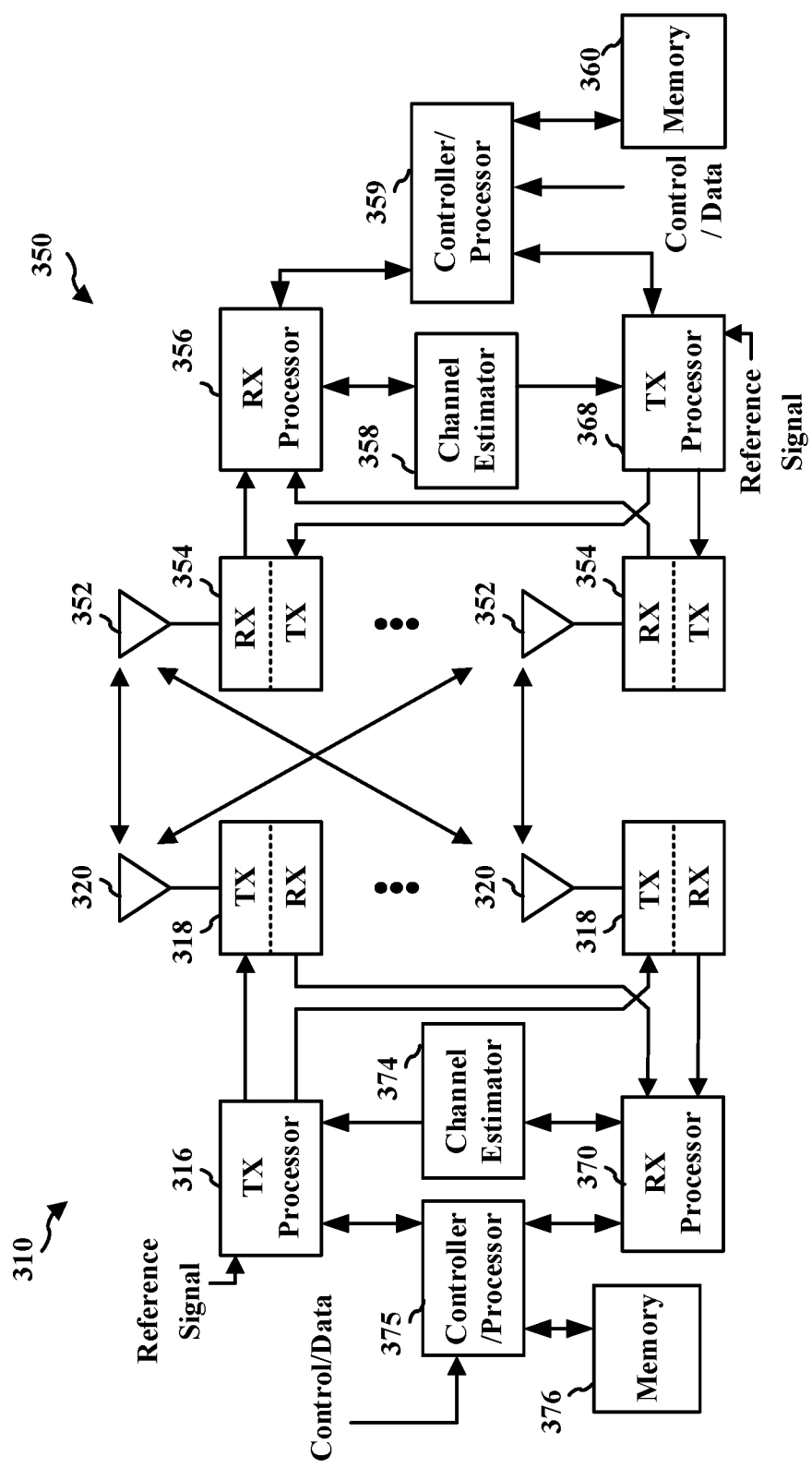
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

According to various aspects of the present disclosure, at least one of the TX processor 368, the RX processor 356, and/or the controller/processor 359 may be configured to perform aspects in connection with 198 of FIG. 1. For example, the controller/processor 359 of the UE 350 may determine, at a first layer of a protocol stack of the UE 350, a first data size associated with a second layer of the protocol stack, such as an application layer. The first data size may exceed a first queue threshold associated with the first layer of the protocol stack of the UE 350. The TX processor 368 of the UE 350 may send an uplink grant request over a wireless network, and the controller/processor 359 may generate the uplink grant request based on the first data size.

Based on the uplink grant request, the RX processor 356 of the UE 350 may receive at least two uplink grants. The at least two uplink grants may indicate a peak TB size per TTI available for uplink communication by the UE 104. Responsive to the at least two uplink grants, the TX processor 368 may send, over the wireless network, first data in a first TTI and second data in a second TTI.

In some aspects, a UE, such as the UE 350, may request an uplink grant and receive the uplink grant in order to send data (e.g., to a base station). Some UEs may send the uplink grant request based only on data (e.g., packet bytes) available in a buffer of a lower layer (e.g., a PHY layer, a MAC layer, etc.), such as a buffer of a modem and/or a Layer 2 (L2) buffer. For example, the UE may send the uplink grant request when the L2 buffer reaches an occupancy level that reaches (e.g., meets or exceeds) a specific threshold.

When the L2 buffer is consistently relatively high (e.g., approaching the specific threshold), a UE may request and receive an uplink grant that is commensurate with the buffer occupancy, and this uplink grant may be approximately equal to the peak uplink grant with which the UE may be scheduled. When the UE maintains this relatively high buffer occupancy, the UE may correspondingly maintain relatively highly occupied buffers at other layers of the UE (e.g., an application layer). Therefore, the UE may consistently have outstanding data that is queued in the UE to be transmitted over a wireless network.

When the UE maintains relatively highly occupied buffers across at least two layers of a protocol stack of the UE, memory consumption may commensurately increase. As an effect of such memory consumption, the UE may experience memory (e.g., cache) inefficiencies and/or relatively large fluctuations in data flow between layers because highly occupied buffers often take longer to be emptied and filled again. Further, the UE may drop packets (which then should be resent) when the one or more buffers are highly occupied and the UE is unable to empty the one or more buffers at a sufficient rate.

As a further consequence of frequent high buffer occupancy, over-the-air signaling may increase as the UE sends a new BSR every time the L2 buffer is refilled after being drained based on an uplink grant. The increased over-the-air signaling may increase consumption of network resources and/or increase overhead of UE operation (e.g., increased over-the-air signaling may increase power consumption by the UE and/or may consume clock cycles of a processor of the UE that may otherwise be allocated to other UE operations).

The present disclosure provides an improved approach to sending uplink data that is buffered by a UE, for example, by managing flow control between layers of a protocol stack of the UE and by requesting an uplink grant based on data at higher layer(s) of the UE that is not buffered at lower layer(s) of the UE when the uplink grant is requested. According to the present disclosure, frequent high occupancy of buffer(s) of the UE may be reduced and/or the uplink data transmission by the UE may occur at a relatively consistent rate (e.g., when an application of the UE generates a large amount of data to be sent). Thus, memory efficiency at the UE may be improved, the number of dropped packets may be reduced, and/or over-the-air signaling may be reduced.

Figure 4:
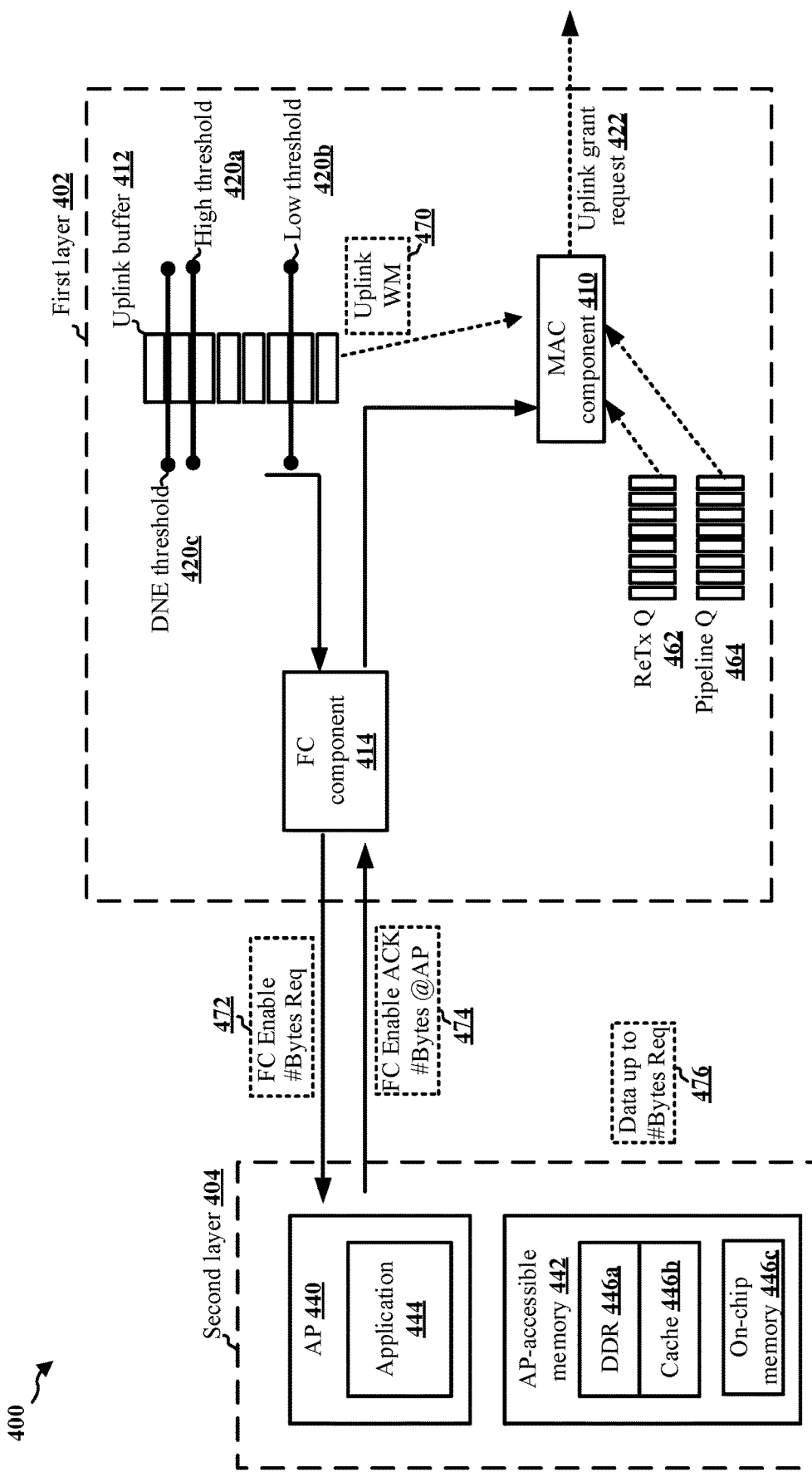
FIG. 4 is a block diagram illustrating an example architecture of a UE.

FIG. 4 illustrates an architecture of a UE 400. The architecture of the UE 400 may include multiple protocol stack layers, including a first layer 402 and a second layer 404. While the architecture of the UE 400 illustrates two layers, additional and/or different layers may be present in different aspects without departing from the scope of the present disclosure.

The first layer 402 may include L2 functionality, such as a PDCP layer, an RLC layer, and/or a MAC layer. For example, the first layer 402 may include a MAC component 410, which may implement various functionality of the MAC layer. In some aspects, the first layer 402 may include more than one layer, including Layer 3 (L3), L2, and/or Layer 1 (L1) (e.g., L1 may include a PHY layer). For example, the first layer 402 may represent one or more layers that are procedurally below the second layer 404 in the protocol stack of the architecture of the UE 400.

Illustratively, the first layer 402 may include a flow control (FC) component 414. The FC component 414 may be implemented in hardware, software, firmware, or a combination thereof. The FC component 414 may manage at least a portion of the data flow between the first layer 402 and the second layer 404. For example, the FC component 414 may control the flow of packets from the second layer 404 to the first layer 402.

The first layer 402 may further include a MAC component 410. The MAC component 410 may be implemented in hardware, software, firmware, or a combination thereof. The MAC component 410 may encapsulate data (e.g., packets) from an uplink buffer 412 in TBs sent during TTIs scheduled according to an uplink grant.

The second layer 404 may include at least one layer that is procedurally implemented above the first layer 402. For example, the second layer 404 may include an application layer. Accordingly, the second layer 404 may include an application 444, the instructions of which may be executed by an application processor (AP) 440.

Each of the first layer 402 and the second layer 404 may include memory in which to queue data for transmission over a wireless network. According to various aspects, the first layer 402 may include an uplink buffer 412, a retransmission queue 462, and an L2 pipeline queue 464. The uplink buffer 412 may include an L2 buffer and/or modem buffer that may queue data for encapsulation in MAC TBs and, therefore, the uplink buffer 412 may be configured to queue data received from a higher layer (e.g., the second layer 404) to be transmitted over the wireless network. The retransmission queue 462 may be configured to queue data that is to be retransmitted, such as packets that are dropped, corrupted, and/or negatively acknowledged (e.g., NACK'ed). The L2 pipeline queue 464 may be configured to queue data of lower layer(s) (e.g., the first layer 402) that is to be transmitted over the wireless network, such as uplink control information, HARQ ACK/NACK data, etc. The aggregate data in the uplink buffer 412, the retransmission queue 462, and the L2 pipeline queue 464 may be collectively referred to as L2 data.

At the second layer 404, the AP 440 may be communicatively coupled with an AP-accessible memory 442. The AP-accessible memory 442 may queue data (e.g., packets) that is to be transmitted over the wireless network, e.g., for the application 444. Data queued in the AP-accessible memory 442 may include application data 476 generated in association with execution of the application 444 by the AP 440.

The AP-accessible memory 442 may have a capacity that is greater than the uplink buffer 412. For example, the AP-accessible memory 442 may be configured to queue approximately two or three megabytes (MB) of data, whereas the uplink buffer 412 may be configured to queue approximately 512 kilobytes (kB) of data. However, other capacities are possible in other aspects.

In one aspect, the AP-accessible memory 442 may include double data rate (DDR) synchronous dynamic random-access memory (SDRAM) 446a. The DDR SDRAM 446a may be attached to a system cache 446b. The AP 440 may be configured to queue application data 476 in the system cache 446b, and defer queuing application data 476 in the DDR SDRAM 446a (e.g., until the system cache 446b is flushed).

In one aspect, the AP-accessible memory 442 may additionally or alternatively include on-chip memory 446c. The AP 440 may be configured to queue application data 476 in the on-chip memory 446c. If the system cache 446b is limited (e.g., due to current operations, such as video/graphics processing by the UE 400), then the on-chip memory 446c may be used as an addition and/or alternative to the system cache 446b. For example, the on-chip memory 446c may provide overflow support when the system cache 446b is at or near capacity. That is, the AP 440 may queue application data 476 in the system cache 446b until the system cache 446b is at or near capacity, and then the AP 440 may switch to queuing application data 476 in the on-chip memory 446c (e.g., until the system cache 446b is flushed).

A size of data queued in memory may be referred to as a watermark (WM). Each WM may be expressed in a byte size (e.g., bytes, kB, and/or MB) and a respective WM may correspond to a data size currently queued in one of the AP-accessible memory 442, the uplink buffer 412, the retransmission queue 462, or the L2 pipeline queue 464. For example, the data size in the uplink buffer 412 may be referred to as an uplink WM 470, and the uplink WM 470 may fluctuate as the uplink buffer 412 is drained and refilled.

In some aspects, multiple thresholds may be configured in association with the uplink buffer 412. For example, the uplink buffer 412 may be configured with a high threshold 420a, a low threshold 420b, and/or a do not exceed (DNE) threshold 420c. One or more of these thresholds 420a-c may be configured by a 3GPP mode handler based on an RRC configuration that is indicated to the UE 400 (e.g., via RRC signaling) and/or may be dynamically configured (e.g., based on observing historical trends associated with draining and refilling the uplink buffer 412). The thresholds 420a-c may be compared with the uplink WM 470.

According to an aspect, the FC component 414 may monitor and manage one or more of the thresholds 420a-c. For example, when the DNE threshold 420c is reached (e.g., the uplink WM 470 is equal to or exceeds the DNE threshold 420c), the FC component 414 may signal the AP 440 to cease sending data to the uplink buffer 412. Therefore, the AP 440 may continue to queue data that is to be sent over the wireless network (e.g., data from the application 444) at AP-accessible memory 442 and/or the AP 440 may allocate other memory in which to queue the data while the uplink buffer 412 is emptied. When the DNE threshold 420c is reached, data sent from the AP 440 may be dropped because the uplink buffer 412 is at or near capacity.

In another example, when the low threshold 420b is reached (e.g., the uplink WM 470 is equal to or below the low threshold 420b), the FC component 414 may signal the AP 440 to resume sending data to the uplink buffer 412, e.g., from the AP-accessible memory 442.

In another example, when the high threshold 420a is reached (e.g., the uplink WM 470 is equal to or above the high threshold 420a), the FC component 414 may determine that no additional data should be queued in the uplink buffer 412. The FC component 414 may generate an FC message indicating that no more data should be sent to the first layer 402 to be queued in the uplink buffer 412. The FC component 414 may send such an FC message to the second layer 404 in order to instruct the AP 440 to refrain some sending additional data to the first layer 402.

In various aspects, the low threshold 420b may be configured to be approximately equal to a data size needed to serve T milliseconds (ms) worth of uplink peak rate transmission. By way of illustration, T may be equal to four ms, each TTI may be equal to 200 microseconds (μs), and the peak MAC TB size per TTI may be equal to eight kB. Therefore, the low threshold 420b may be configured as 160 kB, which is equal to T ms divided by the TTI duration multiplied by the peak TB size or, equivalently in this example, (4 ms/200 μs)*8 kB. In some aspects, the low threshold 420b may be configured to be greater than the data size needed to serve T ms worth of uplink peak rate transmission—e.g., the low threshold 420b may be configured as 200 kB.

The high threshold 420a may be configured to be greater than the low threshold 420b. For example, the high threshold 420a may be configured to be twice the low threshold, such as 400 kB. The DNE threshold 420c may be configured to be greater than the high threshold 420a. For example, the DNE threshold 420c may be configured to be 100 kB or 200 kB greater than the high threshold 420a. The thresholds 420a-c may be configured to have different values in other aspects.

When the uplink buffer 412 includes data, the uplink buffer 412 may be emptied. The MAC component 410 may determine the uplink WM 470 that indicates the data size currently queued in the uplink buffer 412. For example, the MAC component 410 may periodically poll the uplink buffer 412 to receive the uplink WM 470. In another example, the FC component 414 may indicate to the MAC component 410 that the uplink WM 470 has reached at least one of the high threshold 420a or the DNE threshold 420c, and the MAC component 410 may determine the uplink WM 470 based on the indication from the FC component 414.

Based on the uplink WM 470, the MAC component 410 may send, to a base station, an uplink grant request 422 in order to obtain an uplink grant for sending the data queued in the uplink buffer 412. The uplink grant request 422 may include a BSR or buffer occupancy report. For example, the uplink grant request 422 may be based on the uplink WM 470.

In addition to the uplink WM 470, the MAC component 410 may generate an uplink grant request 422 based on data (e.g., packets) in the retransmission queue 462 and/or the L2 pipeline queue 464. Thus, the MAC component 410 may generate the uplink grant request 422 based on the sum of the uplink WM 470, a WM of the AP-accessible memory 442, a WM of the retransmission queue 462, and a WM of the L2 pipeline queue 464.

As the AP 440 executes the instructions of the application 444, application data 476 may be generated to be sent over a wireless network. In order to send the application data 476 over the wireless network, the AP 440 may provide the data to the first layer 402 so that the MAC component 410 may send the data over the wireless network according to a schedule provided by at least two uplink grants received from a base station. However, the size of the application data 476 generated by the AP 440 may exceed the high threshold 420a and/or the DNE threshold 420c of the uplink buffer 412. Therefore, the AP 440 may refrain from sending, to the first layer 402, application data 476 of a size that may otherwise cause the DNE threshold 420c to be exceeded. For example, the AP 440 may queue data to be sent over the wireless network by the MAC component 410.

Application data 476 queued in the AP-accessible memory 442 may still be sent over the wireless network, even though not yet queued in the uplink buffer 412. Thus, requesting an uplink grant that is based on the WM of the AP-accessible memory 442, in addition to the WMs of the uplink buffer 412, the retransmission queue 462, and the L2 pipeline queue 464, may be more efficient than various existing approaches, such as approaches in which an uplink grant is requested based on memory allocated to a MAC layer.

According to some existing network approaches, for example, a request for an uplink grant (e.g., a BSR) may be triggered when a WM of an uplink buffer (e.g., L2 buffer) reaches a reporting threshold. Triggering a BSR based on a reporting threshold of an uplink buffer may cause a UE to frequently send BSRs, as the uplink buffer is drained based on an uplink grant and then refilled after all or most of the data in the uplink buffer is de-queued.

Frequently sending BSRs in this manner may increase consumption of over-the-air resources and result in bursty uplink traffic as the UE sends data when the uplink buffer nears capacity, then does not send data while the uplink buffer is refilled, then sends another BSR when the uplink buffer is refilled to a reporting threshold, and again drains the uplink buffer when another uplink grant is received. Moreover, bursty uplink communication may prevent the UE from receiving a peak uplink grant.

In contrast to this approach, the UE 400 described in the present disclosure may send fewer BSRs and/or consistently send data because the UE 400 may receive a number of peak uplink grants over a number of TTIs sufficient to send application data 476 queued in the AP-accessible memory 442 in addition to queued L2 data (e.g., in the uplink buffer 412). Thus, the UE 400 would need to send one BSR to obtain one or more uplink grants for the accumulation of queued L2 data and application data 476, as opposed to sending multiple BSRs triggered every time an uplink buffer is filled to a reporting threshold and then drained in response to an uplink grant.

In addition, the UE 400 described in the present disclosure may manage memory more efficiently than some existing approaches. For example, when an uplink buffer (e.g., L2 buffer) of a UE is frequently exceeded, other memory may be reallocated from a higher layer(s) to the MAC layer of the UE, e.g., to prevent packet loss when the capacity of the uplink buffer is exceeded. When the other memory is reallocated, the MAC layer may be able to access the reallocated memory and generate a BSR based on data queued in the reallocated memory. However, the reallocated memory may be unavailable to be returned to the higher layer(s), and so the reallocated memory may be unused when unnecessary for queuing data by the MAC layer. Disuse of the reallocated memory may be inefficient and may decrease performance of the UE, e.g., when the reallocated memory is needed for other operations.

In contrast, the UE 400 of the present disclosure may refrain from reallocating memory to the first layer 402. Since the FC component 414 may enable communication with higher layer(s), including the second layer 404, the first layer 402 may be able to generate an uplink grant request based on the WM of the AP-accessible memory 442 without reallocating the AP-accessible memory 442 to the first layer 402. Accordingly, the AP-accessible memory 442 may be efficiently used and may remain available to the higher layer(s), including the second layer 404.

Figure 5:
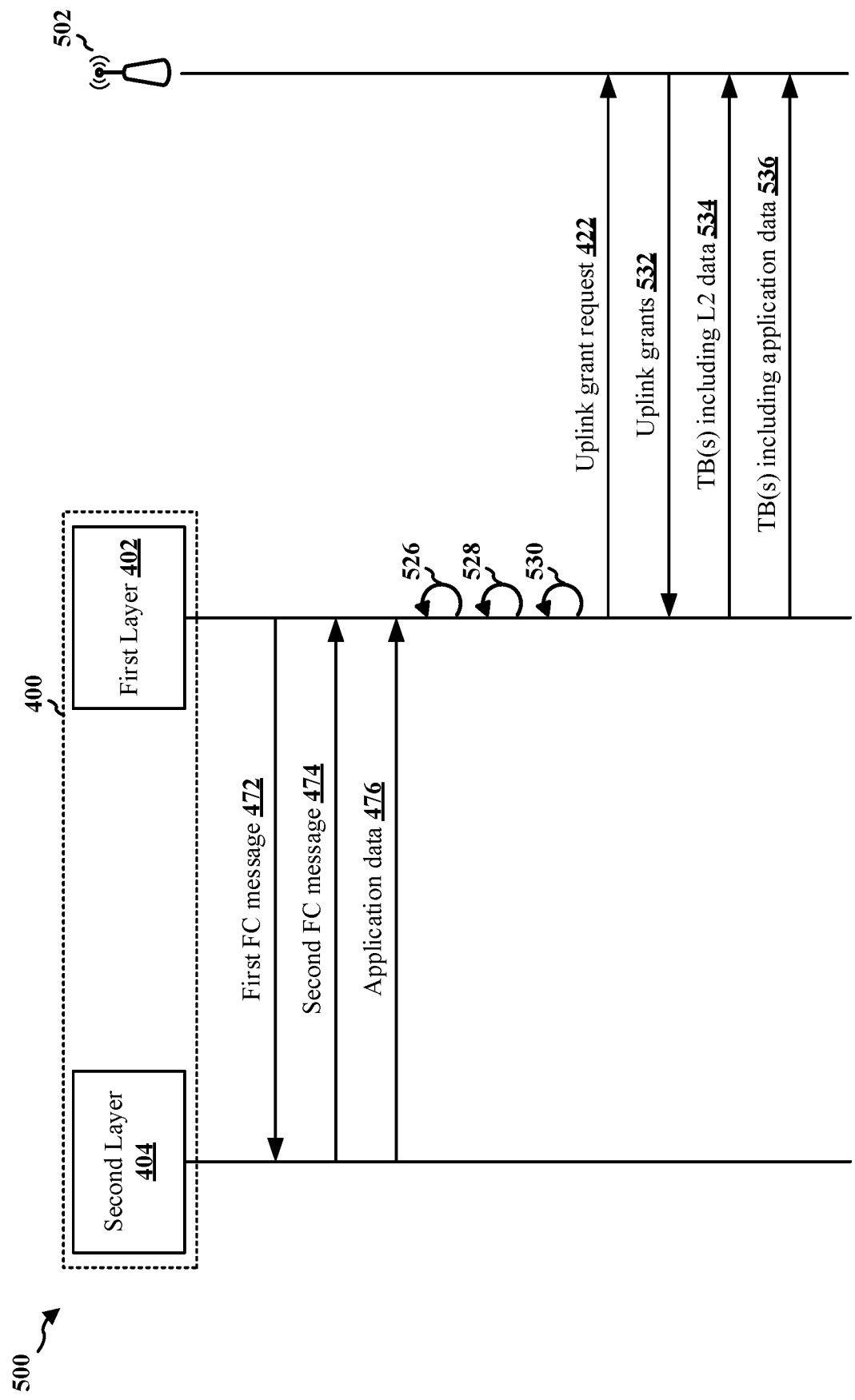
FIG. 5 is a call flow diagram illustrating a wireless communications system.

FIG. 5 illustrates a call flow diagram of a method 500 of managing the flow of data within a UE 400 that includes the first layer 402 and the second layer 404. The UE 400 may be configured to communicate over a wireless network with a base station 502. The base station 502 may schedule uplink communication by the UE 400, and the UE 400 may send data from the uplink buffer 412 according to the scheduling by the base station 502. Therefore, the rate at which the UE 400 is able to de-queue data in the uplink buffer 412 may be controlled by the base station 502 (e.g., the UE 400 may be unable to send data without scheduling by the base station 502).

The first layer 402 (e.g., the MAC component 410 and/or the FC component 414) may be configured to monitor the status of the uplink buffer 412 and refill the uplink buffer 412 (e.g., when the uplink WM 470 reaches the low threshold 420b). Accordingly, the first layer 402 may determine the uplink WM 470 indicating the data size that is currently queued in the uplink buffer 412.

Based on the uplink WM 470, the first layer 402 (e.g., the MAC component 410 and/or the FC component 414) may determine a data size that may be additionally queued in the uplink buffer 412. For example, the first layer 402 may compare the uplink WM 470 to the high threshold 420a, and the difference between the high threshold 420a and the uplink WM 470 may be a size of additional data that may be queued in the uplink buffer 412.

To add additional data to the uplink buffer 412, the first layer 402 may generate a first FC message 472 to send to the second layer 404 (e.g., the AP 440). The first layer 402 may generate the first FC message 472 based on the uplink WM 470 (e.g., based on the difference between the high threshold 420a and the uplink WM 470). In one aspect, the first FC message 472 may indicate a requested data size, which may be a data size that may be additionally queued in the uplink buffer 412.

In addition to the high threshold 420a (e.g., the difference between the high threshold 420a and the uplink WM 470), the first layer 402 may determine the requested data size based on the low threshold 420b. For example, the FC component 414 may determine the requested data size to prevent the uplink WM 470 from reaching (e.g., falling below) the low threshold 420b. In other words, the FC component 414 may calculate the requested data size in order to maintain the uplink WM 470 between the high threshold 420a and the low threshold 420b.

In some aspects, the uplink buffer 412 may be full, such that additional data may not be added to the uplink buffer 412. In such aspects, the first layer 402 may generate a first FC message 472 to send to the second layer 404 (e.g., the AP 440) wherein the first FC message 472 may indicate a data size of zero (0). The first FC message 472 may include an uplink grant for the second layer 404 to transmit data to the first layer 402. The first FC message 472 having a data size of zero (0) indicates to the second layer 404 that the uplink buffer 412 is full and additional data may not be added to the uplink buffer 412. As such, the second layer 404 may still send data to the first layer 402 in response to the first FC message 472 having a data size of zero (0).

In some aspects, the second layer 404 may identify (e.g., by AP 440) an uplink grant for the second layer 404 to transmit data to the first layer 402 based at least in part on the size of the uplink buffer 412. For example, the second layer 404 may identify an uplink grant by determining the uplink grant based at least in part on the size of the uplink buffer 412. The second layer 404 may identify that the uplink buffer 412 is full, such that additional data may not be added to the uplink buffer 412. Therefore, the second layer 404 may identify the uplink grant having a data size of zero (0), in such case, the second layer 404 may determine to send various types of data to the first layer 402.

In order to maintain the uplink WM 470 between the high threshold 420a and the low threshold 420b, the first layer 402 may determine the requested data size further based on a delta variable. For example, the delta variable may be a heuristic value that may be determined by the FC component 414.

The delta variable may prevent the uplink WM 470 from reaching the low threshold 420b. Specifically, the first layer 402 may use the delta variable to anticipate the rate at which data is to be requested from the second layer 404 (e.g., the AP 440). Thus, the first layer 402 may request a data size from the second layer 404 that would otherwise exceed the high threshold 420a when aggregated with the current uplink WM 470. However, the uplink WM 470 may be assumed to decrease as data in the uplink buffer 412 is de-queued during the time between sending an FC message requesting additional application data 476 from the second layer 404 and actually receiving that additional application data 476 from the second layer 404. Thus, the delta variable may contribute to maintaining the uplink WM 470 between the high threshold 420a and the low threshold 420b. By maintaining the uplink WM 470 between the high threshold 420a and the low threshold 420b, the first layer 402 may consistently receive and fulfill peak uplink grants, which may prevent bursty uplink communication and/or prevent the uplink WM 470 from reaching the DNE threshold 420c (e.g., to avoid dropping packets from the second layer 404).

In some aspects, the first layer 402 (e.g., the FC component 414) may determine the delta variable. For example, the first layer 402 may determine 528 a time between sending the first FC message 472 and receiving the application data 476 (up to the requested data size) in response to the first FC message 472. Further, the first layer 402 may determine 530 the delta variable based on the determined time between sending the first FC message 472 and receiving the application data 476 (up to the requested data size). The first layer 402 may calculate the delta variable based on the determined time in order to anticipate the rate at which the uplink buffer 412 is refilled by application data 476 in order to maintain the uplink WM 470 between the high threshold 420a and the low threshold 420b.

In some aspects, the first layer 402 may dynamically determine the delta variable by determining multiple time periods between sending a respective FC message indicating a requested data size and receiving data from the second layer 404 in response to each respective FC message. The first layer 402 may then determine the delta variable based on the determined one or more time periods (e.g., based on the average of the one or more time periods).

The first layer 402 (e.g., the FC component 414) may send the first FC message 472 to the second layer 404 (e.g., to the AP 440). Thus, the first FC message 472 may indicate that the flow of data is enabled (up to the requested data size) from the second layer 404 to the first layer 402. However, in some aspects, such as when the uplink buffer 412 may be full, such that additional data may not be added to the uplink buffer 412, the first FC message 472 may indicate that the flow of data is not enabled or is in a flow disabled state for a given uplink bearer. The first FC message may include an uplink grant for the second layer 404 to transmit data to the first layer 402. In such aspects, the first FC message 472 or uplink grant may indicate a data size of zero (0). The first FC message 472 having a data size of zero (0) may indicate to the second layer 404 that the uplink buffer 412 is full and additional data may not be added to the uplink buffer 412. As such, the second layer 404 may still send various types of data to the first layer 402 in response to the first FC message 472 or uplink grant having a data size of zero (0).

When the second layer 404 (e.g., the AP 440) receives the first FC message 472, the second layer 404 may generate a second FC message 474. The second FC message 474 may include an indication of an acknowledgement (ACK) of the first FC message 472.

Further, the second layer 404 may generate the second FC message 474 to indicate a WM of application data 476 queued in the AP-accessible memory 442. The second layer 404 may generate the second FC message 474 to indicate the WM of the AP-accessible memory 442 based on the requested data size. For example, the data size indicated in the second FC message 474 may be a difference between the current WM of the AP-accessible memory 442 and the requested data size, because application data 476 up to the requested data size will be de-queued from the AP-accessible memory 442 and sent to the first layer 402 in response to the first FC message 472. The second layer 404 may send the second FC message 474 to the first layer 402.

In addition to the second FC message 474, the second layer 404 (e.g., the AP 440) may send application data 476 currently queued in the AP-accessible memory 442 up to the requested data size. For example, if the requested data size indicates 300 kB, then the second layer 404 may send up to 300 kB of application data 476 in response to the first FC message 472. If the AP-accessible memory only includes 200 kB of application data 476, however, then the second layer 404 may send all 200 kB of application data 476 to the first layer 402.

The first layer 402 (e.g., the FC component 414 and/or the MAC component 410) may determine 526 a first data size associated with the second layer 404. The first layer 402 may determine 526 the first data size based on the second FC message 474. For example, the first data size may be the WM of the AP-accessible memory 442 (after sending the application data 476 up to the requested data size), as indicated by the second FC message 474.

In various aspects, the first data size may exceed the high threshold 420a and/or the DNE threshold 420c, and/or the aggregation of the first data size and the uplink WM 470 may exceed the high threshold 420a and/or the DNE threshold 420c. Consequently, the uplink buffer 412 may be unable to further queue all application data 476 queued in the AP-accessible memory 442. Nonetheless, the application data 476 in the AP-accessible memory 442 should be sent to the base station 502, in addition to the L2 data currently in the uplink buffer 412, the retransmission queue 462, and the L2 pipeline queue 464. Thus, uplink communication by the UE 400 may occur at an improved rate if the application data 476 queued in the AP-accessible memory 442 is considered when requesting an uplink grant.

Accordingly, the first layer 402 (e.g., the MAC component 410) may generate an uplink grant request 422 based on the first data size determined 526 by the first layer 402. For example, the first layer 402 may generate the uplink grant request 422 to indicate an aggregated data size that is the sum of the first data size (e.g., the WM of the AP-accessible memory 442) and the WMs of the L2 data (e.g., the sum of the uplink WM 470 including the portion of application data 476 received in response to the first FC message 472, the WM of the retransmission queue 462, and the WM of the L2 pipeline queue 464). Illustratively, the aggregated data size indicated in the uplink grant request 422 may appreciably exceed the capacity of the uplink buffer 412—e.g., the uplink grant request 422 may indicate an aggregated data size of greater than two or three MB, even though the uplink buffer 412 has a capacity of 512 kB.

The first layer 402 may generate the uplink grant request 422 as a BSR, buffer occupancy report, or another similar message configured to solicit an uplink grant. The first layer 402 may then send the uplink grant request 422 to the base station 502.

In response to the uplink grant request 422, the first layer 402 (e.g., the MAC component 410) may receive at least two uplink grants 532 from the base station 502. Each of the at least two uplink grants 532 may be a peak uplink grant that indicates a peak TB size per TTI available for uplink communication by the UE 400. That is, each of the at least two uplink grants 532 may allocate a maximum amount of resources for uplink communication by the UE 400 and/or may schedule the UE 400 on the largest possible amount of resources. The peak uplink grant may be determined by the base station 502, e.g., based on network capabilities and/or network standards.

In various aspects, each of the at least two uplink grants 532 may include multiple uplink grants over multiple TTIs. That is, each of the at least two uplink grants 532 may include a first uplink grant indicating a peak TB size for a first set of TTIs, a second uplink grant indicating the peak TB size for a second set of TTIs that follow the first set of TTIs, a third uplink grant indicating the peak TB size for a third set of TTIs that follow the second set of TTIs, and so forth. In total, the at least two uplink grants 532 may allocate a set of resources over a set of TTIs that is sufficient for uplink communication of all data queued in the AP-accessible memory 442, the uplink buffer 412, the retransmission queue 462, and the L2 pipeline queue 464.

Based on the at least two uplink grants 532, the first layer 402 (e.g., the MAC component 410) may de-queue data in the uplink buffer 412 for uplink transmission. For example, the MAC component 410 may encapsulate packets from the uplink buffer 412 in MAC TBs up to the peak TB size (e.g., eight kB per TTI), and the MAC component 410 may send a first set of TBs 534 (including the encapsulated data) in a first set of TTIs that correspond to resources allocated by one of the at least two uplink grants 532.

Because the aggregated data size may exceed the peak MAC TB per TTI and the uplink grant request 422 may be based on the WM of the application data 476 that remains queued in the AP-accessible memory 442, the at least two uplink grants 532 may allocate resources to the UE 400 for multiple peak MAC TBs over multiple TTIs sufficient to additionally de-queue the application data 476 remaining in the AP-accessible memory 442. For example, after the first layer 402 sends the L2 data encapsulated in the first set of MAC TBs 534, the first layer 402 may de-queue the application data 476 remaining in the AP-accessible memory 442. The first layer 402 (e.g., the MAC component 410) may encapsulate the application data 476 remaining in the AP-accessible memory 442 in MAC TBs up to the peak TB size (e.g., eight kB per TTI), and the first layer 402 may send a second set of TBs 536 (including the encapsulated application data 476) in a second set of TTIs that correspond to resources allocated by another of the at least two uplink grants 532.

When the first layer 402 receives the at least two uplink grants 532, all of the data corresponding to the aggregated data size indicated by the uplink grant request 422 may already be queued at the first layer 402 and the second layer 404. Therefore, the first layer 402 may consistently send peak MAC TBs carrying the maximum size of data as data is encapsulated by the first layer 402. Thus, each of the first set of TBs 534 and the second set of TBs 536 may include data (e.g., L2 data and application data 476, respectively) of approximately a same size. (At least one TB may include a smaller data size when the aggregated data size is not evenly divisible by the peak MAC TB size.) Because the first set of TBs 534 and the second set of TBs 536 may include data of approximately a same size (due to the peak TB size allocated by the at least two uplink grants 532), uplink communication by the UE may be smoother and/or less bursty.

In one aspect, the first layer 402 may de-queue the application data 476 from the AP-accessible memory 442 and queue the application data 476 in the uplink buffer 412 after sending the first set of TBs 534. For example, the application data 476 may be de-queued from the AP-accessible memory 442 and then re-queued in the uplink buffer 412 so that the application data 476 may be encapsulated in MAC TBs by the MAC component 410. In other words, data may flow from the AP-accessible memory 442 to the uplink buffer 412 to refill the uplink buffer 412 as the uplink buffer 412 is drained by encapsulating data in MAC TBs for uplink transmission according to a first of the at least two uplink grants 532.

In some aspects, the first layer 402 may generate and send another first FC message, indicating a requested data size, to the second layer 404 as the uplink buffer 412 is being drained according to a first of the at least two uplink grants 532. Responsive to the other first FC message, the second layer 404 may send additional application data 476 queued in the AP-accessible memory 442 up to the requested data size and, therefore, the first layer 402 may encapsulate that additional application data 476 in MAC TBs for uplink transmission according to a second of the at least two uplink grants 532.

The grant mechanism of the present disclosure between the second layer (e.g., AP 440 of second layer 404 of FIG. 4) and the first layer (e.g., modem of first layer 402 of FIG. 4) may be configured to inform the AP whether to send data or to refrain from sending data, due in part to radio conditions, data available in the radio, and/or modem characteristics. In addition, the grant mechanism may be configured to indicate, to the AP, how much of the data may be sent to the modem, as well as how much data may be accepted at the modem level. The grant mechanism may assist in ensuring that buffers are maintained at the modem and that data is not overflown and discarded, which may result in packet loss and recovery at the end to end protocol level, which may require using an excess amount of resources. In some instances, whenever the FC message or uplink grant is zero (0) from the modem to the AP, the AP may still send various types of data packets to the modem.

In some aspects, for example in bi-directional flow, packet loss may be avoided with the help of the FC message or the uplink grant indicating a data size of zero (0) from the modem to the AP. However, TCP ACK feedback may be delayed even though the TCP ACK feedback packets are not lost from the application to the application. In instances where the modem sends an uplink grant with a data size of zero (0) to the AP, the AP will not send any further packets to the modem, including TCP data packets and TCP ACK feedback packets. The delay of TCP data packets in the uplink may be acceptable as the delay of TCP data packets may only reduce the throughput. However, the delay of various types of data (e.g., TCP ACK feedback packets, cellular vehicle-to-everything (C-V2X) data, virtual reality (VR) data, extended reality (XR) data, ultra-reliable low latency communication (ULLC) data, or any specific traffic type/pattern) in uplink, may become an issue because a majority of user traffic is downlink specific, while most of the radio link may be heavily downlink and less uplink. For example, when a large amounts of data is received in the downlink, if the TCP ACK feedback is not sent, then the network buffers may not be cleared. Also, the base station may need to clear the buffers so that it can receive additional data from its own application server, which may be sitting in a different location.

Having a smooth flow of TCP ACK feedback in the uplink direction may assist to manage the downlink data which may be buffered at the base station level, as well as manage the data exchange between the base station and the application server. The smooth flow of uplink TCP ACK feedback may assist in downlink data handling in a smooth manner, which may improve the user perceived throughput and performance.

Thus, as disclosed herein is a further mechanism between the first layer (e.g., modem) and the second layer (e.g., AP) for instances where a FC message or uplink grant with a data size of zero (0) is sent from the modem to the AP. The mechanism may be configured to allow TCP ACK feedback to flow from the AP to the modem in the absence of the FC message or uplink grant from the modem or regardless of the data size indicated in the FC message or uplink grant. The mechanism may be configured to apply the FC message or uplink grant indicating a data size of zero (0) to TCP data packets and/or other types of data packets only, and not to TCP ACK feedback packets, such that TCP ACK feedback packets may be sent and/or are not delayed due to the FC message or uplink grant indicating a data size of zero (0). As such, an application processor may be configured to send TCP ACK feedback packets on the uplink even when a given uplink bearer is in a flow disabled state. At least one advantage of allowing TCP ACK feedback packets to be sent while an uplink bearer is in the flow disabled state, is that UEs may be allowed to support peak TCP downlink data rates even during low uplink grant scenarios. Allowing TCP ACK feedback packets to be sent during the flow disabled state also assists base stations in clearing buffers and fetching further data from the application server, which may move the TCP window smoothly rather than getting stuck or having burstyness.

The present grant mechanism may be applied when a TCP bidirectional flow is detected and the uplink data competes for uplink bandwidth. In such instances, the grant mechanism between the first layer (e.g., modem) and the second layer (e.g., AP) may prioritize the TCP ACK feedback packets in the modem flow, even when the flow is disabled, which may allow for an increase in bidirectional performance.

Figure 6:
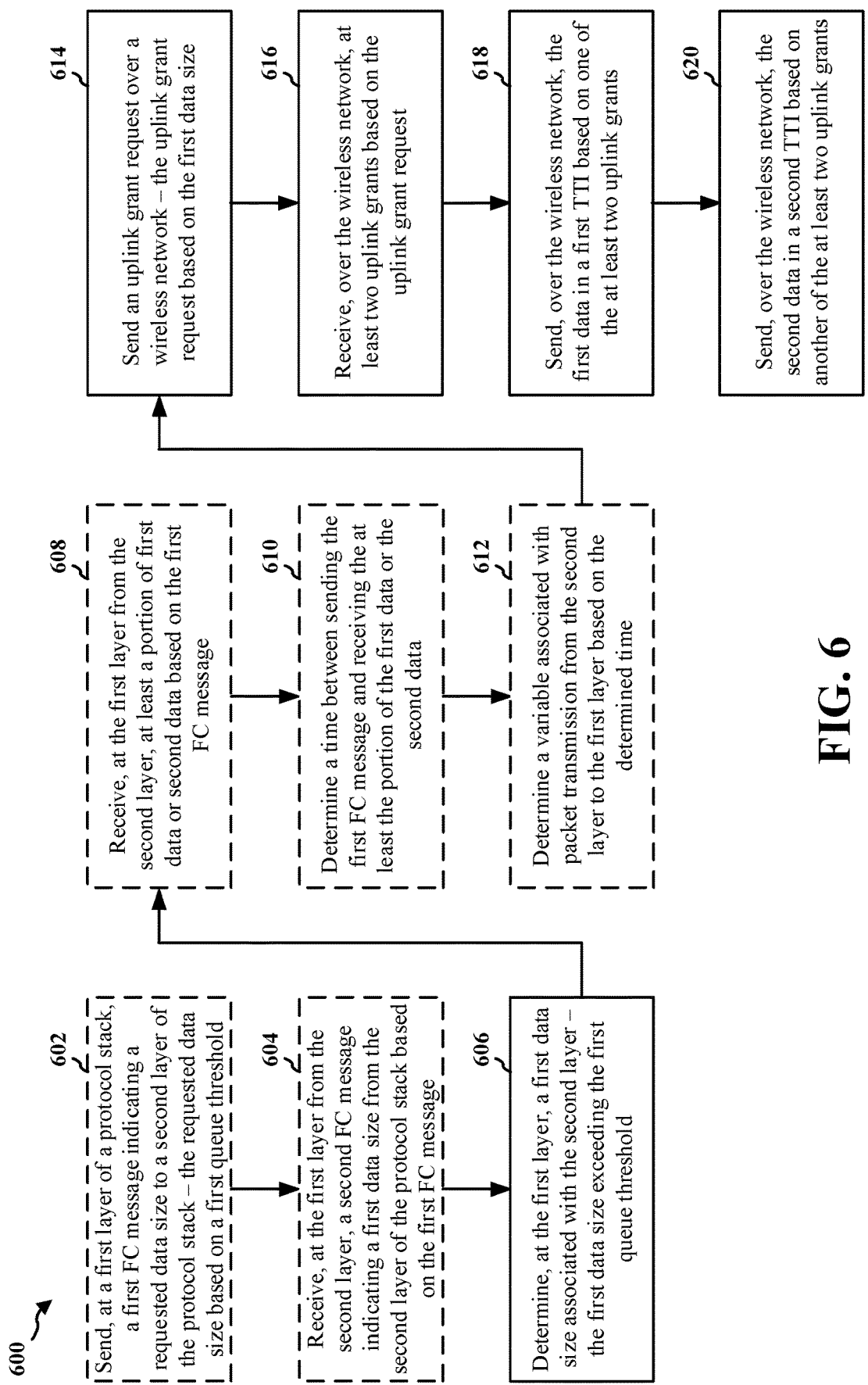
FIG. 6 is a flowchart of a method of wireless communication.

FIG. 6 is a flowchart 600 of a method of wireless communication. The method may be performed by a UE or a component of a UE (e.g., the UE 104, 350, 400; the apparatus 902; the cellular baseband processor 904, which may include the memory 360 and which may be the entire UE 350 or a component of the UE 350, and/or the controller/processor 359). The UE and/or apparatus may include at least a first layer, such as a PHY and/or MAC layer, and a second layer, such as an application layer. According to various aspects, one or more of the illustrated operations of the method 600 may be omitted, transposed, and/or contemporaneously performed.

In some aspects, for example at 602, the UE may send, at a first layer of a protocol stack of the UE, a first FC message to a second layer of the protocol stack. For example, 602 may be performed by first layer component 740 of apparatus 702. The first FC message may indicate a requested data size, and the requested data size may be based on a first queue threshold. In some aspects, the requested data size may be further based on a variable associated with packet transmission from the second layer to the first layer. In the context of FIGS. 4-5, the first layer 402 may send the first FC message 472 to the second layer 404.

In some aspects, for example at 604, the UE may receive, at the first layer of the protocol stack, a second FC message from the second layer based on the first FC message. For example, 604 may be performed by first layer component 740 of apparatus 702. The second FC message may acknowledge the first FC message and may indicate a first data size associated with the second layer. For example, the first data size may indicate a size of data queued at the second layer. In the context of FIGS. 4-5, the first layer 402 may receive, from the second layer 404, the second FC message 474 that indicates a WM associated with application data 476 queued at the AP-accessible memory 442.

At 606, the UE may determine the first data size associated with the second layer. For example, 606 may be performed by first layer component 740 of apparatus 702. For example, the first layer of the protocol stack may identify information indicating the first data size included in the second FC message, and the first layer of the protocol stack may compare the first data size to a first queue threshold. The first layer of the protocol stack may determine that the first data size exceeds the first queue threshold associated with the first layer. In the context of FIGS. 4-5, the first layer 402 may determine 526 the first data size, which may be the WM associated with application data 476 queued at the AP-accessible memory 442 (subtracting the requested data size, which may be provided to the first layer 402 to be queued in the uplink buffer 412).

In some aspects, for example at 608, the UE may receive, at the first layer of the protocol stack, at least a portion of first data or second data based on the first FC message. For example, 608 may be performed by first layer component 740 of apparatus 702. The at least the portion of the first data or the second data may include application data and may have a size approximately equal to the requested data size. In the context of FIGS. 4-5, the first layer 402 may receive at least a portion of the application data 476 based on the first FC message 472, and the received application data 476 may have a size approximately equal to the requested data size indicated by the first FC message 472.

In some aspects, for example at 610, the UE may determine a time between sending the first FC message and receiving the at least the portion of the first data or the second data. For example, 610 may be performed by first layer component 740 of apparatus 702. The UE may determine a first time at which the first FC message was sent, and may determine a second time at which the at least the portion of the first data or the second data was received. The UE may compare the determined first time with the determined second time to determine the difference. In the context of FIGS. 4-5, the first layer 402 may determine 528 a time between sending the first FC message 472 to the second layer 404 and receiving the application data 476 from the second layer 404.

In some aspects, for example at 612, the UE may determine a variable associated with packet transmission from the second layer to the first layer based on the determined time. For example, 612 may be performed by first layer component 740 of apparatus 702. The first layer of the protocol stack may dynamically determine the variable by determining multiple time periods between sending a respective FC message indicating a requested data size and receiving data from the second layer of the protocol stack in response to each respective FC message. The first layer 402 may then determine the variable based on the determined one or more time periods (e.g., based on the average of the one or more time periods). In some aspects, the requested data size indicated in the first FC message may be further based on the determined variable. In the context of FIGS. 4-5, the first layer 402 may determine 530 the delta variable, and the requested data size indicated in the first FC message 472 may be further based on the delta variable.

At 614, the UE may send an uplink grant request over a wireless network. For example, 614 may be performed by first layer component 740 of apparatus 702. The uplink grant request may be based on the first data size. The uplink grant request may indicate a sum of at least the first data size, a second data size associated with a first queue of the first layer, and a third data size associated with a retransmission queue. In the context of FIGS. 4-5, the first layer 402 may send the uplink grant request 422. The first layer 402 may indicate, in the uplink grant request 422, a sum of a WM of the AP-accessible memory 442, the uplink WM 470, a WM of the retransmission queue 462, and a WM of the L2 pipeline queue 464.

At 616, the UE may receive, over the wireless network, at least two uplink grants based on the first data size indicated in the uplink grant request. For example, 616 may be performed by first layer component 740 of apparatus 702. Each of the at least two uplink grants may indicate a peak TB size per TTI available for uplink communication by the UE. In the context of FIGS. 4-5, the first layer 402 may receive, from the base station 502, the at least two uplink grants 532. Each of the at least two uplink grants 532 may allocate a peak grant to the UE.

At 618, the UE may send, over the wireless network, first data in a first TTI based on a first of the at least two uplink grants. For example, 618 may be performed by first layer component 740 of apparatus 702. The UE may encapsulate data buffered in an uplink buffer in a first set of MAC TBs, and the UE may send the first set of MAC TBs in a first set of TTIs allocated by the first of the at least two uplink grants. In the context of FIGS. 4-5, the first layer 402 may encapsulate data from the uplink buffer 412 in the first set of MAC TBs 534, and the first layer 402 may send the first set of MAC TBs 534 in a first set of TTIs.

At 620, the UE may send, over the wireless network, second data in a second TTI based on a second of the at least two uplink grants. For example, 620 may be performed by first layer component 740 of apparatus 702. The UE may retrieve data queued at a higher layer (e.g., application layer), and the UE may encapsulate the retrieved data in a second set of MAC TBs. The UE may send the second set of MAC TBs in a second set of TTIs allocated by the second of the at least two uplink grants. In one aspect, the first data encapsulated in the first set of MAC TBs and the second data encapsulated in the second set of MAC TBs may be of approximately a same size. In the context of FIGS. 4-5, the first layer 402 may encapsulate data from the AP-accessible memory 442 in the second set of MAC TBs 536, and the first layer 402 may send the second set of MAC TBs 536 in a second set of TTIs.

Figure 7:
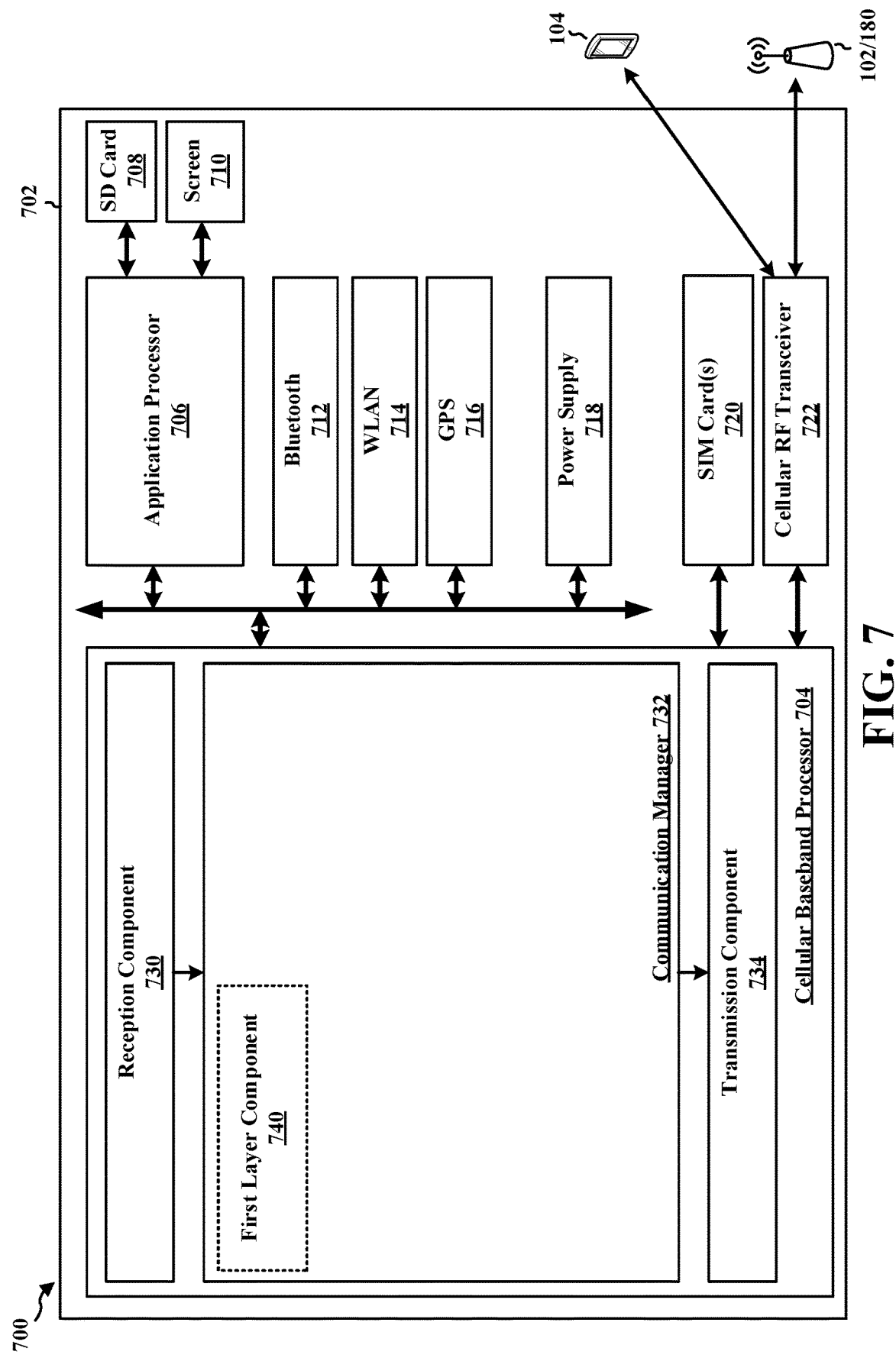
FIG. 7 is a diagram illustrating an example of a hardware implementation for an apparatus employing a processing system.

FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or BS 102/180. The cellular baseband processor 704 may include a computer-readable medium/memory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., see 350 of FIG. 3) and include the aforementioned additional modules of the apparatus 702.

The communication manager 732 includes a first layer component 740 that is configured to send, at a first layer of a protocol stack of the UE, a first FC message to a second layer of the protocol stack, e.g., as described in connection with 602 of FIG. 6. The first layer component 740 is further configured to receive, at the first layer of the protocol stack, a second FC message from the second layer based on the first FC message, e.g., as described in connection with 604 of FIG. 6. The first layer component 740 is further configured to determine the first data size associated with the second layer, e.g., as described in connection with 606 of FIG. 6. The first layer component 740 is further configured to receive, at the first layer of the protocol stack, at least a portion of first data or second data based on the first FC message, e.g., as described in connection with 608 of FIG. 6. The first layer component 740 is further configured to determine a time between sending the first FC message and receiving the at least the portion of the first data or the second data, e.g., as described in connection with 610 of FIG. 6. The first layer component 740 is further configured to determine a variable associated with packet transmission from the second layer to the first layer based on the determined time, e.g., as described in connection with 612 of FIG. 6. The first layer component 740 is further configured to send an uplink grant request over a wireless network, e.g., as described in connection with 614 of FIG. 6. The first layer component 740 is further configured to receive, over the wireless network, at least two uplink grants based on the first data size indicated in the uplink grant request, e.g., as described in connection with 616 of FIG. 6. The first layer component 740 is further configured to send, over the wireless network, first data in a first TTI based on a first of the at least two uplink grants, e.g., as described in connection with 618 of FIG. 6. The first layer component 740 is further configured to send, over the wireless network, second data in a second TTI based on a second of the at least two uplink grants, e.g., as described in connection with 620 of FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for determining, at the first layer, a first data size associated with the second layer. The first data size exceeding the first queue threshold. The apparatus includes means for sending an uplink grant request over a wireless network. The uplink grant request based on the first data size. The apparatus includes means for receiving, over the wireless network, at least two uplink grants based on the uplink grant request. The apparatus includes means for sending, over the wireless network, the first data in a first TTI based on one of the at least two uplink grants. The apparatus includes means for sending, over the wireless network, the second data in a second TTI based on another of the at least two uplink grants. The apparatus further includes means for sending, at a first layer of a protocol stack, a first FC message indicating a requested data size to a second layer of the protocol stack. The requested data size based on a first queue threshold. The apparatus further includes means for receiving, at the first layer from the second layer, a second FC message indicating a first data size from the second layer of the protocol stack based on the first FC message. The apparatus further includes means for receiving, at the first layer from the second layer, at least a portion of first data or second data based on the first FC message. The apparatus further includes means for determining a time between sending the first FC message and receiving the at least the portion of the first data or the second data. The apparatus further includes means for determining a variable associated with packet transmission from the second layer to the first layer based on the determined time. The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
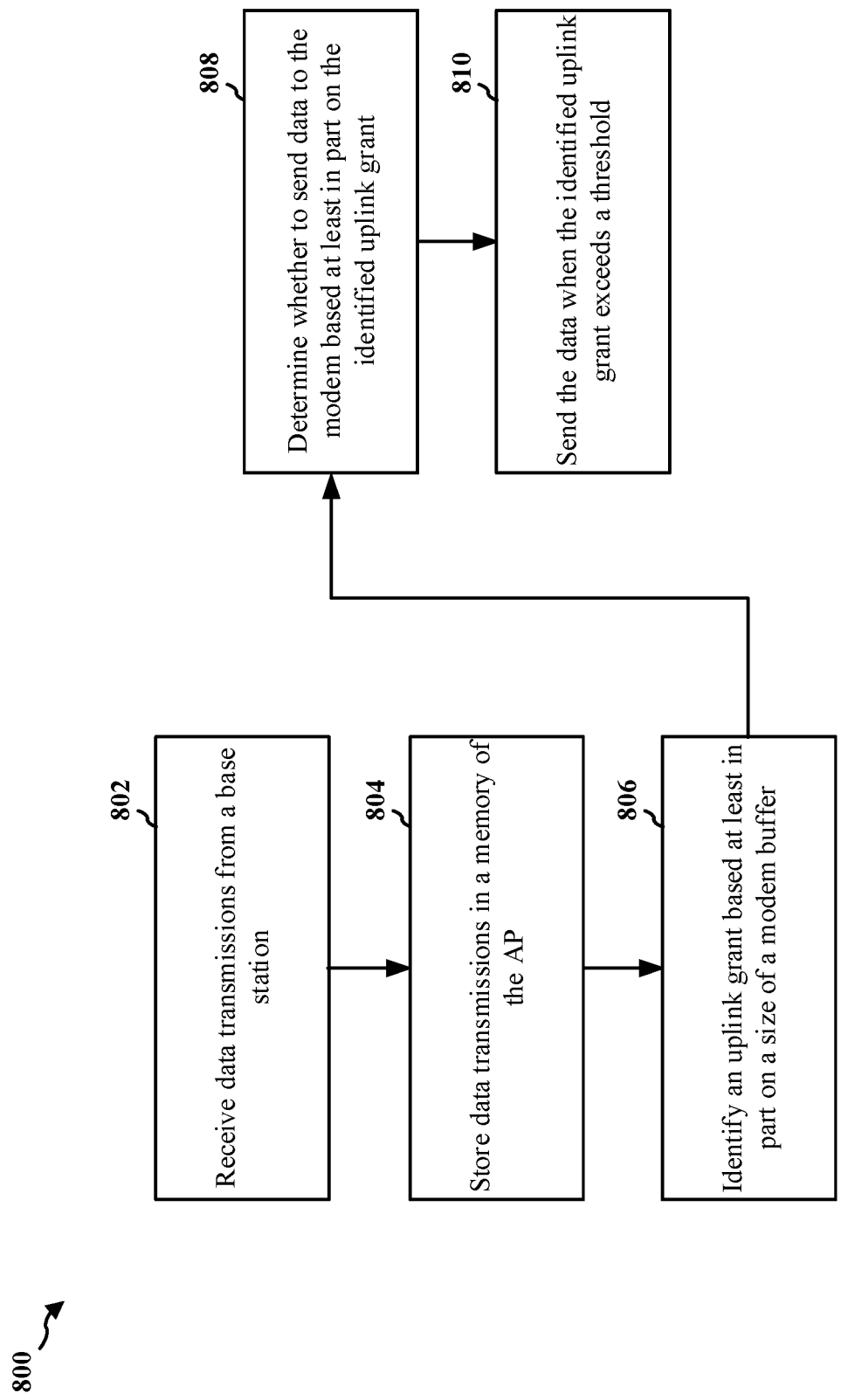
FIG. 8 is a flowchart of another method of wireless communication.

FIG. 8 is a flowchart illustrating a method 800 of wireless communication. The method may be performed by a UE or a component of a UE (e.g., the UE 104, 350, 400; the apparatus 902; the cellular baseband processor 904, which may include the memory 360 and which may be the entire UE 350 or a component of the UE 350, and/or the controller/processor 359). The UE and/or apparatus may include at least a first layer, such as a PHY and/or MAC layer, and a second layer, such as an application layer. One or more of the illustrated operations may be omitted, transposed, or contemporaneous. The method may enable a UE to send data to a modem, from the AP, in the absence of an uplink grant from the modem.

At 802, the UE may receive data transmissions from a base station. For example, 802 may be performed by reception component 930 of apparatus 902. The data transmissions may be received over a wireless network. For example, the UE may receive data transmissions via the first layer 402 and the first layer 402 may provide the data transmission to the second layer 404.

At 804, the UE may store the data transmissions in a memory of the UE. For example, 804 may be performed by memory component 940 of apparatus 902. In some aspects, the data transmissions may be stored in a memory of the AP. For example, the AP 440 of the second layer 404 may store the data transmissions in a memory 442.

At 806, the UE may identify an uplink grant based at least in part on a size of a modem buffer. For example, 806 may be performed by identification component 942 of apparatus 902. In some aspects, the AP of the UE may be configured to identify the uplink grant. For example, the UE, in identifying the uplink grant, may receive an uplink grant from the modem. For example, the AP 440 of the second layer 404 may receive the first FC message 472 from the first layer 402, where the first FC message 472 may include the uplink grant. In another example, the UE, in identifying the uplink grant, may include determining, by the AP, the uplink grant based at least in part on the size of the modem buffer. For example, the AP 440 of the second layer 404 may receive the first FC message 472 from the first layer 402, where the first FC message 472 may include the uplink grant and may be based at least in part on the size of uplink buffer 412. The uplink grant may be various different sizes. For example, when an uplink bearer is in a disabled state, the uplink grant may be zero. In some aspects, the uplink grant may be greater than 0.

At 808, the UE may determine whether to send data to the modem. For example, 808 may be performed by determination component 944 of apparatus 902. The UE may determine whether to send data to the modem based at least in part on the identified uplink grant. In some aspects, the AP or second layer may be configured to determine whether to send data to the modem or first layer based at least in part on the identified uplink grant. For example, the AP 440 of the second layer 404 may generate a second FC message 474 to indicate the WM of the AP-accessible memory 442 based on the requested data size. In some aspects, the data sent to the modem or first layer may include TCP data or TCP ACK feedback associated with the data transmissions received from the base station. In some aspects, the data sent to the modem or first layer may include TCP data, TCP ACK feedback, cellular vehicle-to-everything (C-V2X) data, virtual reality (VR) data, extended reality (XR) data, ultra-reliable low latency communication (ULLC) data, or any specific traffic type/pattern. In some aspects, the data may include any identified application data that may correspond to a specified application that is identified by the modem. In some aspects, to determine whether to send data to the modem from the AP, the AP may be configured to manage the flow of data from the AP to the modem. The AP may manage the flow of data from the AP to the modem based at least on one or more threshold of the modem or uplink buffer. For example, the buffer 412 may be configured with a high threshold 420*a*, a low threshold 420*b*, or a DNE threshold 420*c*, such that the AP may manage the flow of data from the AP to the modem by ceasing to send data, sending data, or queueing data in view of the thresholds 420*a-c*.

At 810, the UE may send the data when the identified uplink grant exceeds a threshold. For example, 810 by may be performed by transmission component 934 of apparatus 902. For example, the AP 440 of the second layer 404 may send application data 476 to the first layer 402. In some aspects, the AP or second layer may be configured to send the data when the identified uplink grant is zero (0). In some aspects, when the uplink grant is zero (0), the uplink grant may be indicating a data size of zero (0), such that the modem buffer of the modem may be full and/or may not be able to receive data from the AP. As such, the AP may be in a flow disabled state and may not send any data to the modem. In some aspects, the TCP ACK feedback may be sent by the AP to the modem, despite the identified uplink grant being zero (0). In some aspects, the AP may be configured to apply the identified grant to data packets other than to TCP ACK feedback, such that TCP ACK feedback may be sent to the modem without delay.

Figure 9:
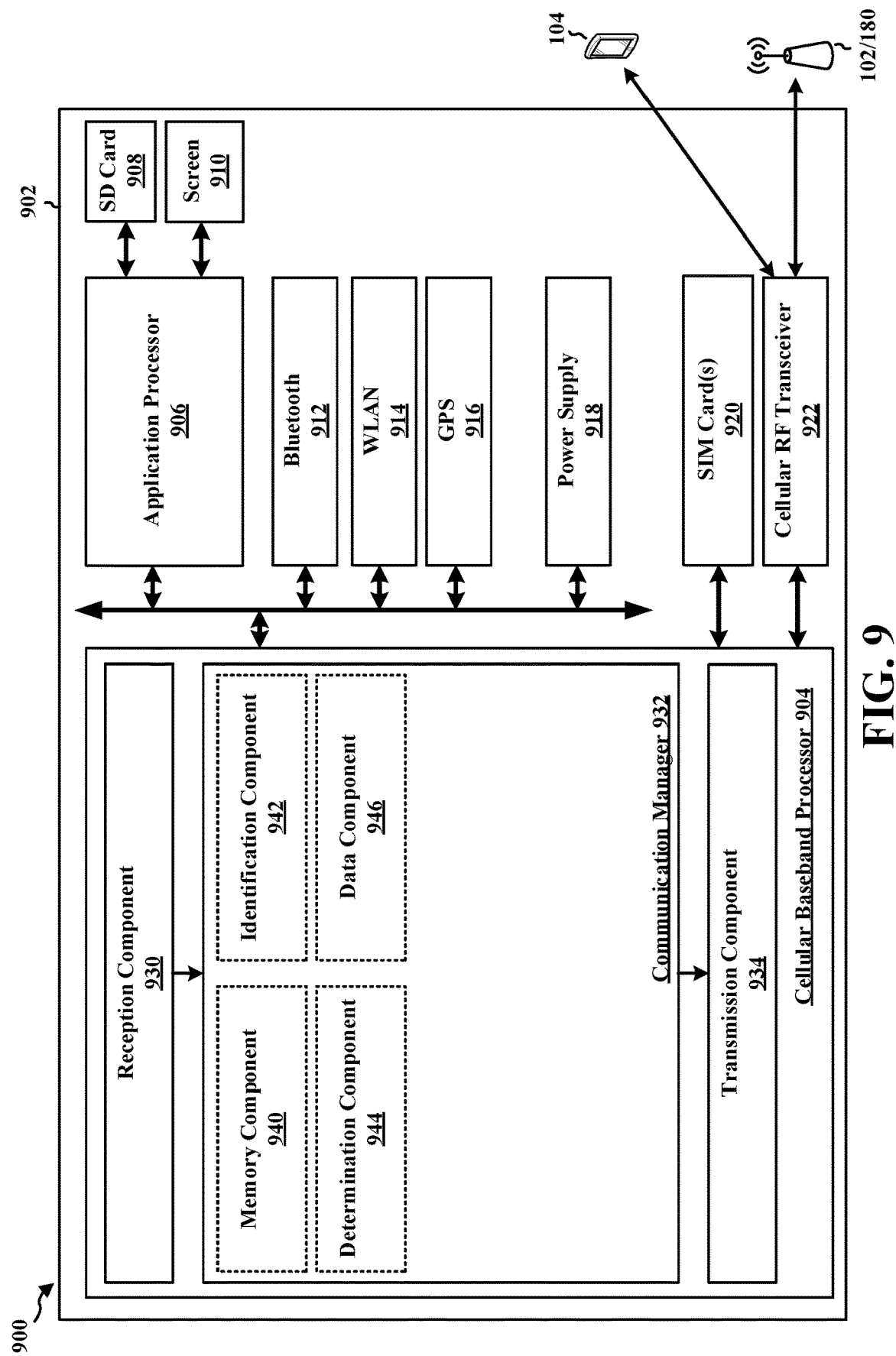
FIG. 9 is a diagram illustrating an example of a hardware implementation for an apparatus employing a processing system.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforementioned additional modules of the apparatus 902.

The communication manager 932 includes a memory component 940 that is configured to store the data transmissions in a memory of the UE, e.g., as described in connection with 804 of FIG. 8. The communication manager 932 further includes an identification component 942 that is configured to identify an uplink grant based at least in part on a size of a modem buffer, e.g., as described in connection with 806 of FIG. 8. The communication manager 932 further includes a determination component 944 that is configured to determine whether to send data to the modem, e.g., as described in connection with 808 of FIG. 8. The communication manager 932 further includes a data component 946 that is configured to send data when the identified uplink grant is 0, e.g., as described in connection with 810 of FIG. 8. The reception component 930 is configured to receive data transmissions from a base station, e.g., as described in connection with 802 of FIG. 8. The transmission component 934 may be configured to send the data when the identified uplink grant exceeds a threshold, e.g., as described in connection with 810 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving data transmissions from a base station. The apparatus includes means for storing the data transmissions in a memory of the application processor (AP) of the UE. The apparatus includes means for identifying, by the AP of the UE, an uplink grant based at least in part on a size of a modem buffer. The apparatus includes means for determining, by the AP, whether to send data to the modem based at least in part on the identified uplink grant. The apparatus includes means for sending, by the AP, the data when the identified uplink grant is 0. The means for determining whether to send data to the modem from the AP is configured to manage the flow of data from the AP to the modem based at least on one or more thresholds of the modem buffer. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teaching described herein, without limitation.

Example 1 is a method of wireless communication at a UE, comprising receiving data transmissions from a base station; storing the data transmissions in a memory of the AP of the UE; identifying, by the AP of the UE, an uplink grant based at least in part on a size of a modem buffer; determining, by the AP, whether to send data to the modem based at least in part on the identified uplink grant; and sending, by the AP, the data when the identified uplink grant exceeds a threshold.

In Example 2, the method of Example 1 further includes that identifying the uplink grant includes receiving an uplink grant from the modem.

In Example 3, the method of Example 1 or 2 further includes that identifying the uplink grant includes determining by the AP an uplink grant.

In Example 4, the method of any of Examples 1-3 further includes that the data includes TCP data or TCP ACK feedback associated with the data transmissions.

In Example 5, the method of any of Examples 1-4 further includes that the data includes TCP ACK feedback, C-V2X data, VR data, XR data, ULLC data, or any specific traffic type/pattern.

In Example 6, the method of any of Examples 1-5 further includes that to determine whether to send data to the modem from the AP, the AP is configured to manage the flow of data from the AP to the modem based at least on one or more thresholds of the modem buffer.

In Example 7, the method of any of Examples 1-6 further includes that the data includes any identified application data that corresponds to a specified application that is identified by the modem.

Example 8 is a device including one or more processors and one or more memories in electronic communication with the one or more processors storing instructions executable by the one or more processors to cause the system or apparatus to implement a method as in any of Examples 1-7.

Example 9 is a system or apparatus including means for implementing a method or realizing an apparatus as in any of Examples 1-7.

Example 10 is a non-transitory computer readable medium storing instructions executable by one or more processors to cause the one or more processors to implement a method as in any of Examples 1-7.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE), comprising:
   receiving data transmissions from a base station;
   identifying, by an application processor (AP) of the UE, an uplink grant for the AP to transmit data to a modem based at least in part on a size of a modem buffer;
   determining, by the AP and based on the identified uplink grant, to send data to the modem based on the data comprising a transmission control protocol (TCP) acknowledgement (ACK) feedback; and
   sending, based on determining to send the data by the AP, the data comprising the TCP ACK feedback.

2. The method of claim 1, wherein identifying the uplink grant includes receiving the uplink grant from the modem.

3. The method of claim 1, wherein identifying the uplink grant includes determining by the AP the uplink grant.

4. The method of claim 1, wherein the data includes TCP data.

5. The method of claim 1, wherein the data includes cellular vehicle-to-everything (C-V2X) data, virtual reality (VR) data, extended reality (XR) data, ultra-reliable low latency communication (ULLC) data, or any specific traffic type/pattern.

6. The method of claim 1, wherein to determine to send the data to the modem from the AP, the AP is configured to:
   manage a flow of the data from the AP to the modem based at least on one or more thresholds of the modem buffer.

7. The method of claim 1, wherein the data includes any identified application data that corresponds to a specified application that is identified by the modem.

8. The method of claim 1, wherein the uplink grant indicates at least one of that a flow of the data is not enabled or that the uplink grant is associated with a data size of 0.

9. An apparatus for wireless communication at a user equipment (UE), comprising:
   memory; and
   at least one processor coupled to the memory and configured to:
      receive data transmissions from a base station;
      identify, by an application processor (AP) of the UE, an uplink grant for the AP to transmit data to a modem based at least in part on a size of a modem buffer;
      determine, by the AP and based on the identified uplink grant, to send data to the modem based on the data comprising a transmission control protocol (TCP) acknowledgement (ACK) feedback; and
      send, based on determining to send the data by the AP, the data comprising the TCP ACK feedback.

10. The apparatus of claim 9, wherein to identify the uplink grant the at least one processor is configured to receive the uplink grant from the modem.

11. The apparatus of claim 9, wherein to identify the uplink grant the at least one processor is configured to determine the uplink grant.

12. The apparatus of claim 9, wherein the data includes TCP data.

13. The apparatus of claim 9, wherein the data includes cellular vehicle-to-everything (C-V2X) data, virtual reality (VR) data, extended reality (XR) data, ultra-reliable low latency communication (ULLC) data, or any specific traffic type/pattern.

14. The apparatus of claim 9, wherein to determine to send the data to the modem from the AP, the at least one processor is configured to:
   manage a flow of the data from the AP to the modem based at least on one or more thresholds of the modem buffer.

15. The apparatus of claim 9, wherein the data includes any identified application data that corresponds to a specified application that is identified by the modem.

16. The apparatus of claim 9, wherein the uplink grant indicates at least one of that a flow of the data is not enabled or that the uplink grant is associated with a data size of 0.

17. An apparatus for wireless communication at a user equipment (UE), comprising:
   means for receiving data transmissions from a base station;
   means for identifying, by an application processor (AP) of the UE, an uplink grant for the AP to transmit data to a modem based at least in part on a size of a modem buffer;
   means for determining, by the AP and based on the identified uplink grant, to send data to the modem based on the data comprising a transmission control protocol (TCP) acknowledgement (ACK) feedback; and means for sending, based on determining to send the data by the AP, the data comprising the TCP ACK feedback.

18. The apparatus of claim 17, wherein the means for identifying the uplink grant is configured to receive the uplink grant from the modem.

19. The apparatus of claim 17, wherein the means for identifying the uplink grant includes means for determining by the AP the uplink grant.

20. The apparatus of claim 17, wherein the data includes TCP data.

21. The apparatus of claim 17, wherein the data includes cellular vehicle-to-everything (C-V2X) data, virtual reality (VR) data, extended reality (XR) data, ultra-reliable low latency communication (ULLC) data, or any specific traffic type/pattern.

22. The apparatus of claim 17, wherein the means for determining to send the data to the modem from the AP is configured to:
manage a flow of the data from the AP to the modem based at least on one or more thresholds of the modem buffer.

23. The apparatus of claim 17, wherein the data includes any identified application data that corresponds to a specified application that is identified by the modem.

24. A non-transitory computer-readable medium storing computer executable code at a user equipment (UE), the code when executed by a processor cause the processor to:
receive data transmissions from a base station;
identify, by an application processor (AP) of the UE, an uplink grant for the AP to transmit data to a modem based at least in part on a size of a modem buffer;
determine, by the AP and based on the identified uplink grant, to send data to the modem based on the data comprising a transmission control protocol (TCP) acknowledgement (ACK) feedback; and
send, based on determining to send the data by the AP, the data comprising the TCP ACK feedback.

25. The non-transitory computer-readable medium of claim 24, wherein to identify the uplink grant the processor is configured to receive the uplink grant from the modem.

26. The non-transitory computer-readable medium of claim 24, wherein to identify the uplink grant the processor is configured to determine the uplink grant.

27. The non-transitory computer-readable medium of claim 24, wherein the data includes TCP data.

28. The non-transitory computer-readable medium of claim 24, wherein the data includes cellular vehicle-to-everything (C-V2X) data, virtual reality (VR) data, extended reality (XR) data, ultra-reliable low latency communication (ULLC) data, or any specific traffic type/pattern.

29. The non-transitory computer-readable medium of claim 24, wherein to determine to send the data to the modem from the AP, the processor is configured to:
manage a flow of the data from the AP to the modem based at least on one or more thresholds of the modem buffer.

30. The non-transitory computer-readable medium of claim 24, wherein the data includes any identified application data that corresponds to a specified application that is identified by the modem.

* * * * *